Sept. 3, 1957  G. V. PLUMLEY ET AL  2,804,845
VETERINARIAN'S ANIMAL RESTRAINER
Filed Oct. 24, 1955  2 Sheets-Sheet 1

Glenn V. Plumley
William B. Stevens
INVENTORS

BY *Clarence A. O'Brien*
*and Harvey B. Jackson*
Attorneys

Sept. 3, 1957  G. V. PLUMLEY ET AL  2,804,845
VETERINARIAN'S ANIMAL RESTRAINER
Filed Oct. 24, 1955  2 Sheets-Sheet 2
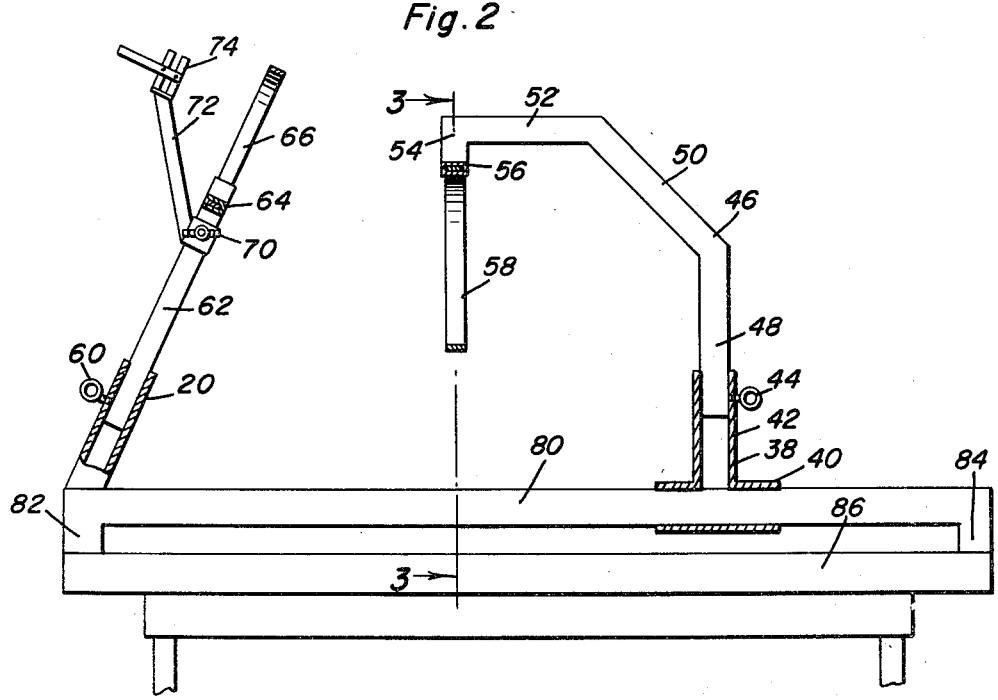
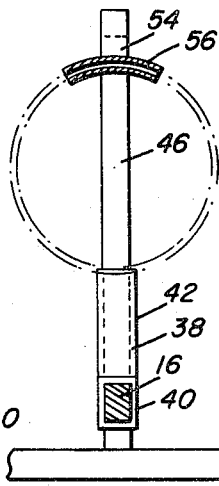
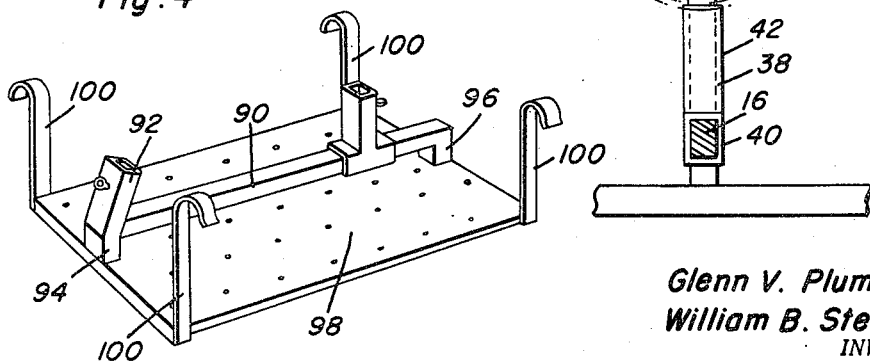
Glenn V. Plumley
William B. Stevens
INVENTORS

United States Patent Office 2,804,845
Patented Sept. 3, 1957

2,804,845
VETERINARIAN'S ANIMAL RESTRAINER

Glenn V. Plumley and William B. Stevens, Lomita, Calif.

Application October 24, 1955, Serial No. 542,309

5 Claims. (Cl. 119—102)

This invention relates to the class of apparatus for use in conjunction with animal husbandry and more particularly to a novel veterinarian's restrainer.

The primary object of the present invention resides in the provision of an animal restraining device for use in the examination and treatment of various types of animals and dogs in particular, whereby an animal may be restrained from undesired movement in order that a veterinarian can perform such functions as are necessary unhampered by movement of the animal.

The construction of this invention features a main frame which carries a slide on which a hanger is mounted. An adjustable support bar is also provided which carries a strap engageable about the neck portion of the animal. In this manner, dogs or other animals of various shapes and sizes can be easily held in position for treatment.

An additional object of the invention resides in the provision of a novel restraining device adapted to be utilized while bathing an animal thereby enabling the animal to be secured in a bathtub or the like without requiring total immersion of the animal.

An additional object of the invention resides in the provision of an animal restraining device which can be utilized in conjunction with the operating table of a veterinarian to safely support the animal during treatment and examination.

Still further objects and features of this invention reside in the provision of an animal restraining device that is simple in construction, highly efficient in use, strong and durable, and inexpensive to manufacture thereby permitting wide use and distribution.

These, together with the various ancillary objects and features of the invention which will become apparent as the following description proceeds, are attained by this animal restraining device, preferred embodiments of which have been illustrated in the accompanying drawings, by way of example only, wherein:

Figure 2 is a vertical sectional detailed view of a modified form of the invention adapted to be utilized in conjunction with an operating table;

Figure 3 is a vertical sectional view as taken along the plane of line 3—3 in Figure 2; and, Figure 4 is a perspective view of a modified form of the invention showing the frame attached to a perforated plate having supporting hangers.

Figure 1:
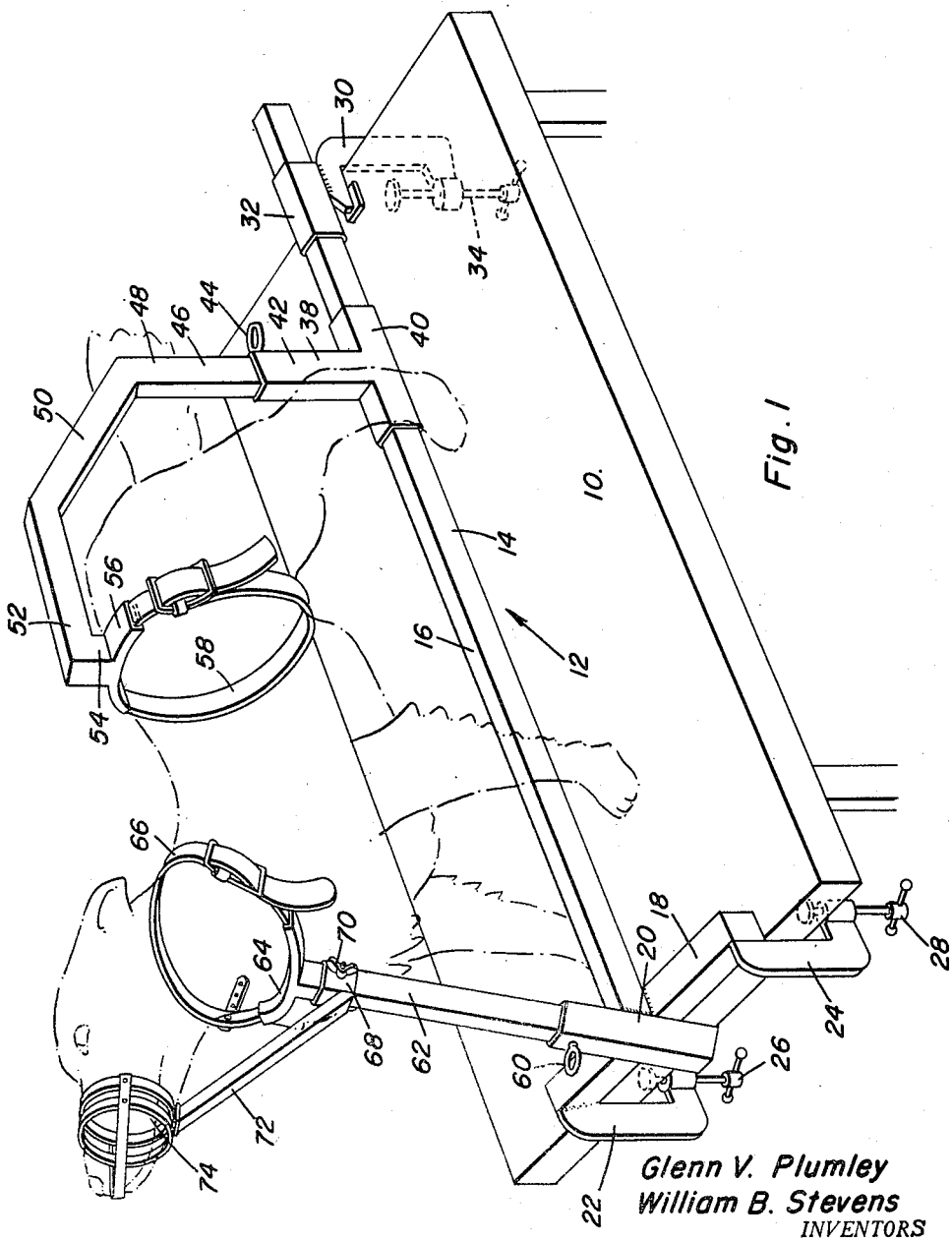
Figure 1 is a perspective view of the animal restraining device comprising the present invention showing an embodiment thereof adapted to be clampingly secured to a table.

With continuing reference to the accompanying drawings wherein like reference numerals designate similar parts throughout the various views, the reference numeral 10 generally designates a table of any convenient size and shape on which the animal restraining device generally designated by reference numeral 12 is adapted to be secured. In this form of the invention, the animal restraining device 12 includes a main frame 14 including a longitudinal member 16 having welded therebeneath a transverse member 18 as well as an angularly extending socket 20.

Welded to the transverse member 16 are a pair of clamps 22 and 24 having adjustable clamp members 26 and 28 whereby the fixed clamp members 22 and 24 can be used to clampingly hold the animal restraining device 12 to the table 10. A movable clamp 30 which is mounted on a tubular slide 32 and which depends therefrom is utilized to hold the other end of the animal restraining device 12 in secured position on the table 10 and the movable clamp member 30 includes an adjustable clamping element 34.

The longitudinally extending main frame member 16 is thus spaced from the top surface of the table 10 by the clamp arrangement and slidably positioned on the longitudinal frame member 16 is a slide 38 of substantially inverted T-shape which has a tubular horizontal portion 40 as well as a tubular vertical portion 42. Adjustably received in the tubular vertical portion 42 and held in place by means of a set screw 44 is a hanger 46.

The hanger 46 has an upwardly extending portion 48, an angularly upwardly extending portion 50 and a substantially horizontal portion 52 which terminates in a downwardly extending portion 54 carrying an arcuate tubular member or saddle 56 through which a belt 58 is inserted, the belt 58 being adapted to be secured about the body portions of a dog or other animal.

Adjustably held in the socket 20 by means of a set screw 60 or the like is a support bar 62 which carries an arcuate tubular member or saddle 64 through which another strap 66 is inserted. The strap 66 is adapted to be secured about the neck of a dog or other animal. A muzzle member includes a slide 68 held in place by a set screw 70 in an adjustable manner and includes an angularly upwardly extending bar 72 which carries a metallic nosepiece 74 formed of suitable rings of metal or the like which are padded for the comfort of the animal.

All contact portions of this animal restraining device may be padded as found necessary in order to prevent discomfort of the animal.

In the embodiment of the invention as is shown in Figure 2, all of the parts thereof are substantially identical except for the fact that the frame 14 is eliminated and a frame as is indicated at 80 is utilized which is of generally U-shape in configuration having leg portions as at 82 and 84 which may be welded or otherwise secured permanently to the top of an operating table as at 86.

In the embodiment of the invention as is shown in Figure 4, a substantially U-shaped frame 90 is utilized which has the socket 92 preferably integrally formed therewith and has legs 94 and 96 which secure the frame 90 to a perforated plate 98 adapted to be supported by means of hangers of substantially inverted J-shape as at 100 which are adapted to engage the lip of a bathtub, wash basin or the like so as to hold the plate 98 in position thereon. The perforated plate 98 permits fluid to flow therethrough thus enabling wash water to conveniently drain therethrough during the various stages of the washing operation as may be necessary such as during rinsing and when letting the water out of the bathtub or washtub.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal restraining device comprising a main frame, a slide of inverted T-shape slidably mounted on said frame, a hanger vertically adjustably secured to said slide, a first strap carried by said hanger and engageable about the body portion of an animal, a support bar vertically adjustably secured to said frame, and a second strap carried by said support bar engageable about the neck of an animal, said hanger and said support bar having arcuate tubular members secured thereto, said first strap and said second strap being engaged in said arcuate tubular members.

2. An animal restraining device comprising a main frame, a slide of inverted T-shape slidably mounted on said frame, a hanger vertically adjustably secured to said slide, a first strap carried by said hanger and engageable about the body portion of an animal, a support bar vertically adjustably secured to said frame, a second strap carried by said support bar engageable about the neck of an animal, said hanger and said support bar having arcuate tubular members secured thereto, said first strap and said second strap being engaged in said arcuate tubular members, and a muzzle slidably adjustably mounted on said support bar.

3. An animal restraining device comprising a main frame, a slide of inverted T-shape slidably mounted on said frame, a hanger vertically adjustably secured to said slide, a first strap carried by said hanger and engageable about the body portion of an animal, a support bar vertically adjustably secured to said frame, a second strap carried by said support bar engageable about the neck of an animal, a perforated plate secured to said frame, and upwardly extending hangers of inverted J-shape secured to said plate.

4. An animal restraining device comprising a main frame, a slide of inverted T-shape slidably mounted on said frame, a hanger vertically adjustably secured to said slide, a first strap carried by said hanger and engageable about the body portion of an animal, a support bar vertically adjustably secured to said frame, a second strap carried by said support bar engageable about the neck of an animal, said hanger and said support bar having arcuate tubular members secured thereto, said first strap and said second strap being engaged in said arcuate tubular members, a muzzle slidably adjustably mounted on said support bar, a perforated plate secured to said frame, and upwardly extending hangers of inverted J-shape secured to said plate.

5. An animal restraining device comprising a main frame, a slide of inverted T-shape slidably mounted on said frame, a hanger vertically adjustably secured to said slide, a first strap carried by said hanger and engageable about the body portion of an animal, a support bar vertically adjustably secured to said frame, and a second strap carried by said support bar engageable about the neck of an animal, said hanger and said support bar having arcuate tubular members secured thereto, said first strap and said second strap being engaged in said arcuate tubular members, a fixed clamp fixedly secured to said frame, and a movable clamp adjustably secured on said frame.

References Cited in the file of this patent

UNITED STATES PATENTS

| | | |
|---|---|---|
| 377,456 | Haitz | Feb. 7, 1888 |
| 408,257 | Pattee | Aug. 6, 1889 |
| 803,600 | Kendall | Nov. 7, 1905 |
| 1,879,915 | Smoot | Sept. 27, 1932 |
| 2,495,965 | Gustaveson | Jan. 31, 1950 |

FOREIGN PATENTS

| | | |
|---|---|---|
| 309,428 | Germany | Nov. 25, 1918 |